(12) United States Patent
MacKay

(10) Patent No.: US 7,389,608 B1
(45) Date of Patent: Jun. 24, 2008

(54) FISHING CHEST

(76) Inventor: Michael Vincent MacKay, 26953 Caicos Ct., Murrieta, CA (US) 92653

( * ) Notice: Subject to any disclaimer, the term of this patent is extended or adjusted under 35 U.S.C. 154(b) by 0 days.

(21) Appl. No.: 11/726,323

(22) Filed: Mar. 21, 2007

(51) Int. Cl.
*A01K 97/05* (2006.01)
*A01K 97/06* (2006.01)

(52) U.S. Cl. .................. 43/57; 43/54.1; 43/55; 43/17.5; 206/315.11; 62/457.1; 62/264

(58) Field of Classification Search ................ 43/54.1, 43/55–57, 21.2, 17.5; 206/315.11; 224/920, 224/922; 62/457.1, 457.7, 264
See application file for complete search history.

(56) References Cited

U.S. PATENT DOCUMENTS

| | | | | |
|---|---|---|---|---|
| 2,286,146 A * | 6/1942 | Lock | ............................... | 43/57 |
| 2,403,858 A * | 7/1946 | Groom et al. | ................... | 43/56 |
| 2,511,648 A * | 6/1950 | Milholland | ................. | 62/457.1 |
| 2,555,073 A * | 5/1951 | Zdankoski | ...................... | 43/55 |
| 2,823,971 A * | 2/1958 | Hoyt | .......................... | 43/54.1 |
| 3,000,133 A * | 9/1961 | Couey | ............................ | 43/57 |
| 3,068,607 A * | 12/1962 | Ward | ............................... | 43/56 |
| 3,171,566 A * | 3/1965 | Mitchell | ...................... | 43/54.1 |
| 3,835,575 A * | 9/1974 | Kelley et al. | .................... | 43/57 |
| 3,938,132 A * | 2/1976 | Cunningham | ............... | 43/17.5 |
| 3,958,359 A * | 5/1976 | Doughty | ......................... | 43/55 |
| 4,353,182 A * | 10/1982 | Junkas et al. | .................... | 43/55 |
| 4,555,862 A * | 12/1985 | Panasewich | .................. | 43/54.1 |
| 4,615,137 A * | 10/1986 | Radmanovich | ................ | 43/57 |
| 4,691,470 A * | 9/1987 | Landell et al. | .................. | 43/55 |
| 4,697,379 A * | 10/1987 | McPhaul | ...................... | 43/54.1 |
| 4,787,169 A * | 11/1988 | Maxfield et al. | ................ | 43/57 |
| 4,841,661 A * | 6/1989 | Moore | .......................... | 43/54.1 |
| 4,882,872 A * | 11/1989 | Todd | ............................... | 43/55 |
| 5,092,263 A * | 3/1992 | Hutchison et al. | ............... | 43/55 |
| 5,105,958 A * | 4/1992 | Patton | ......................... | 215/388 |
| 5,109,625 A * | 5/1992 | Skrede | ............................ | 43/56 |
| 5,305,544 A * | 4/1994 | Testa, Jr. | ......................... | 43/57 |
| 5,333,408 A * | 8/1994 | Simmons | ..................... | 43/17.5 |
| 5,471,779 A * | 12/1995 | Downey | ...................... | 43/54.1 |
| 5,499,473 A * | 3/1996 | Ramberg | ......................... | 43/55 |
| 5,524,761 A * | 6/1996 | Wayman | ..................... | 206/545 |

(Continued)

FOREIGN PATENT DOCUMENTS

FR 2569948 A1 * 3/1986

(Continued)

*Primary Examiner*—Darren W Ark
(74) *Attorney, Agent, or Firm*—Kyle Fletcher

(57) ABSTRACT

The invention is a fishing cooler that has wheels and a handle. The fishing cooler also features a plurality of cup holders, an externally removable and attachable rod holder, and a tackle box that can be attached either internally or externally. The fishing cooler has two internal compartments. The first compartment is for storing bait, and is smaller than the second compartment, which is for storing caught fish. Water can pass between each compartment, and a drain plug enables evacuation of all water inside of the cooler. Integrated on top of the cooler is a measuring line for such uses as measuring caught fish. The handle is hingedly connected at one side of the cooler, and extends when in use to enable the end user to pull the cooler behind he or she. The cooler may also include a drain cup and aerator that can be attached to either of the two drain plug holes. A portable light may be attached to the cooler.

2 Claims, 6 Drawing Sheets

U.S. PATENT DOCUMENTS

| | | | | |
|---|---|---|---|---|
| 5,611,170 | A * | 3/1997 | McGuff et al. | 43/54.1 |
| 5,634,291 | A * | 6/1997 | Pham | 43/57 |
| 5,636,469 | A * | 6/1997 | Pizzolo et al. | 43/55 |
| 5,704,158 | A * | 1/1998 | Whiteaker | 43/54.1 |
| 5,799,435 | A * | 9/1998 | Stafford | 43/57 |
| 5,802,760 | A * | 9/1998 | Campbell | 43/57 |
| 5,822,916 | A * | 10/1998 | Power | 43/57 |
| 5,864,981 | A * | 2/1999 | Zeman | 43/57 |
| 5,931,019 | A * | 8/1999 | White et al. | 62/457.7 |
| 5,938,023 | A * | 8/1999 | Herron et al. | 43/54.1 |
| 5,941,016 | A * | 8/1999 | Welcher | 43/55 |
| 5,992,086 | A * | 11/1999 | Cheng | 43/57 |
| 6,076,298 | A * | 6/2000 | Teel | 43/54.1 |
| 6,185,860 | B1 * | 2/2001 | Thibodeaux | 43/54.1 |
| 6,237,765 | B1 * | 5/2001 | Hagen et al. | 43/55 |
| 6,305,185 | B1 * | 10/2001 | Sloan | 62/457.7 |
| 6,446,382 | B1 * | 9/2002 | Cloutier et al. | 43/54.1 |
| 6,467,779 | B1 * | 10/2002 | Mills | 224/922 |
| 6,474,097 | B2 * | 11/2002 | Treppedi et al. | 62/457.7 |
| D467,770 | S * | 12/2002 | Blalock | D7/605 |
| 6,519,965 | B1 * | 2/2003 | Blanchard et al. | 62/457.7 |
| 6,691,451 | B1 * | 2/2004 | Keenan | 43/55 |
| 6,729,066 | B1 * | 5/2004 | Howley | 43/57 |
| 6,997,007 | B1 * | 2/2006 | Wyatt | 62/457.7 |
| 7,140,507 | B2 * | 11/2006 | Maldonado et al. | 62/457.7 |
| 7,155,859 | B1 * | 1/2007 | Brooks | 43/54.1 |
| 2007/0051031 | A1 * | 3/2007 | Allen | 43/57 |
| 2007/0101754 | A1 * | 5/2007 | Maldonado | 62/457.7 |
| 2007/0119093 | A1 * | 5/2007 | Jaskulski | 43/54.1 |

FOREIGN PATENT DOCUMENTS

| | | | | |
|---|---|---|---|---|
| JP | 05056735 | A | * | 3/1993 |
| JP | 07274788 | A | * | 10/1995 |
| JP | 08298910 | A | * | 11/1996 |
| JP | 09037697 | A | * | 2/1997 |
| JP | 09154464 | A | * | 6/1997 |
| JP | 10215746 | A | * | 8/1998 |
| JP | 10243763 | A | * | 9/1998 |
| JP | 10262531 | A | * | 10/1998 |
| JP | 10276645 | A | * | 10/1998 |
| JP | 10323151 | A | * | 12/1998 |
| JP | 10327729 | A | * | 12/1998 |
| JP | 11155451 | A | * | 6/1999 |
| JP | 2001148961 | A | * | 6/2001 |
| JP | 2001218545 | A | * | 8/2001 |

* cited by examiner

FISHING CHEST

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of fishing coolers.

B. Prior Art

The Hagen et al. patent (U.S. Pat. No. 6,237,765) discloses a fishing bait bucket which has an outer shell, an inner bait receiving chamber, and a cooling chamber for receiving ice or the like. However, the cooler disclosed under the Hagen does not include an aerator that attaches to the drain plug for aerating water container therein.

The Thibodeaux patent (U.S. Pat. No. 6,185,860) discloses a fishing cooler that includes a lid having measuring indicia therein for measuring fish. The top of the cooler has some bore holes and grooves to accommodate cups, which hold the fishing rods. However, the cooler disclosed under the Thibodeaux patent does not include an attachable aerator for aerating water contained therein for the purpose of keeping living bait and caught fish alive for a prolonged period of time. Nor does the cooler disclosed under the Thibodeaux patent include an attachable light.

The Cloutier et al. patent (U.S. Pat. No. 6,446,382) discloses a combined fishing tackle holder and food cooler. The cooler has a pair of retractable rod holders, a fishing rod storing means, a plurality of pull-out drawers, and a lid folds up to reveal a seat. However, the tackle holder and food cooler disclosed under the Cloutier patent does not include an attachable aerator for aerating water contained therein and prolonging the period of time that caught fish and live bait may be kept alive.

The Pizzolo et al. patent (U.S. Pat. No. 5,636,469) discloses a fishing tackle box with a cutting board top portion. As previously discussed, the fishing tackle box disclosed under the Pizzolo patent does not include an attachable aerator for aerating water contained therein and prolonging the period of time that caught fish and live bait may be kept alive.

The Downey patent (U.S. Pat. No. 5,471,779) discloses a fishing implement storage apparatus which includes an ice chest and a rod holder. As mentioned in the preceding two patents, the storage apparatus disclosed under the Downey patent does not include an attachable aerator for aerating water contained therein and prolonging the period of time that caught fish and live bait may be kept alive.

The Zeman patent (U.S. Pat. No. 5,864,981) discloses a combination tackle box, bait well, and cooler. However, the device disclosed under the Zeman patent does not include an aerator for prolonging the amount of time that caught fish and live bait may be kept alive.

The Testa, Jr. patent (U.S. Pat. No. 5,305,544) discloses a bait storage, cooler, and tackle holder arrangement which includes a drainage means. However, the device disclosed under the Testa patent does not include an aerator for prolonging the amount of time that caught fish and live bait may be kept alive.

The Power patent (U.S. Pat. No. 5,822,916) discloses a battery operated storage container which is divided into two compartments, one for bait and a second for caught fish. The container has a pump for controlling the filling, emptying, and aerating functions. However, the storage container disclosed under the Power patent does not include an attachable and detachable aerator, drain cup, light, tackle box, rod holder; nor does it include two drain plugs.

The Blanchard, Sr. et al. patent (U.S. Pat. No. 6,519,965) discloses a portable cooler having external lighting. However, the portable cooler disclosed under the Blanchord patent does not include an attachable or detachable aerator, drain cup, fishing rod holder, light, or tackle box.

The Blalock patent (U.S. Pat. No. Des. 467,770) illustrates an ornamental design for a portable cooler.

BRIEF SUMMARY OF THE INVENTION

The invention is a fishing cooler that has wheels and a handle. The fishing cooler also features a plurality of cup holders, an externally removable and attachable rod holder, and a tackle box that can be attached either internally or externally. The fishing cooler has two internal compartments. The first compartment is for storing bait, and is smaller than the second compartment, which is for storing caught fish. Water can pass between each compartment, and a drain plug enables evacuation of all water inside of the cooler. Integrated on top of the cooler is a measuring line for such uses as measuring caught fish. The handle is hingedly connected at one side of the cooler, and extends when in use to enable the end user to pull the cooler behind he or she. The cooler may also include a drain cup and aerator that can be attached to either of the two drain plug holes. A portable light may be attached to the cooler.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
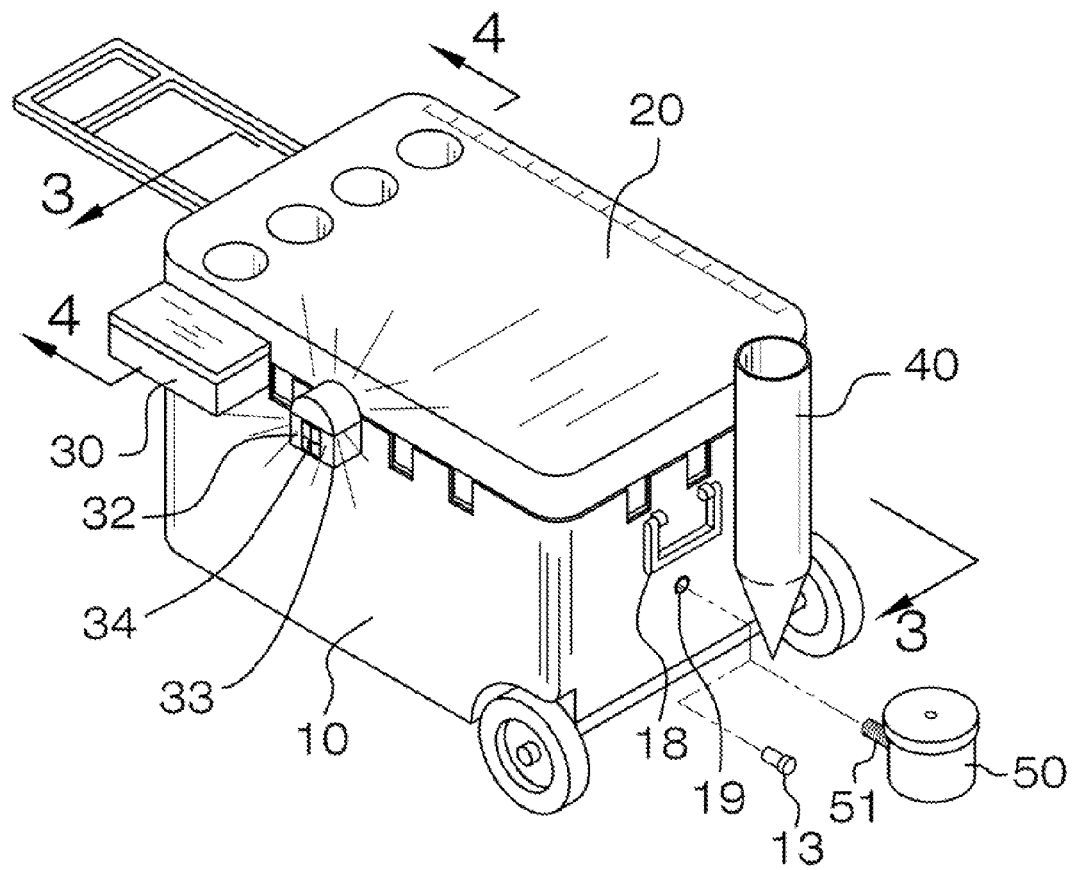
FIG. 1 illustrates an isometric view of the invention by itself.
Figure 2:
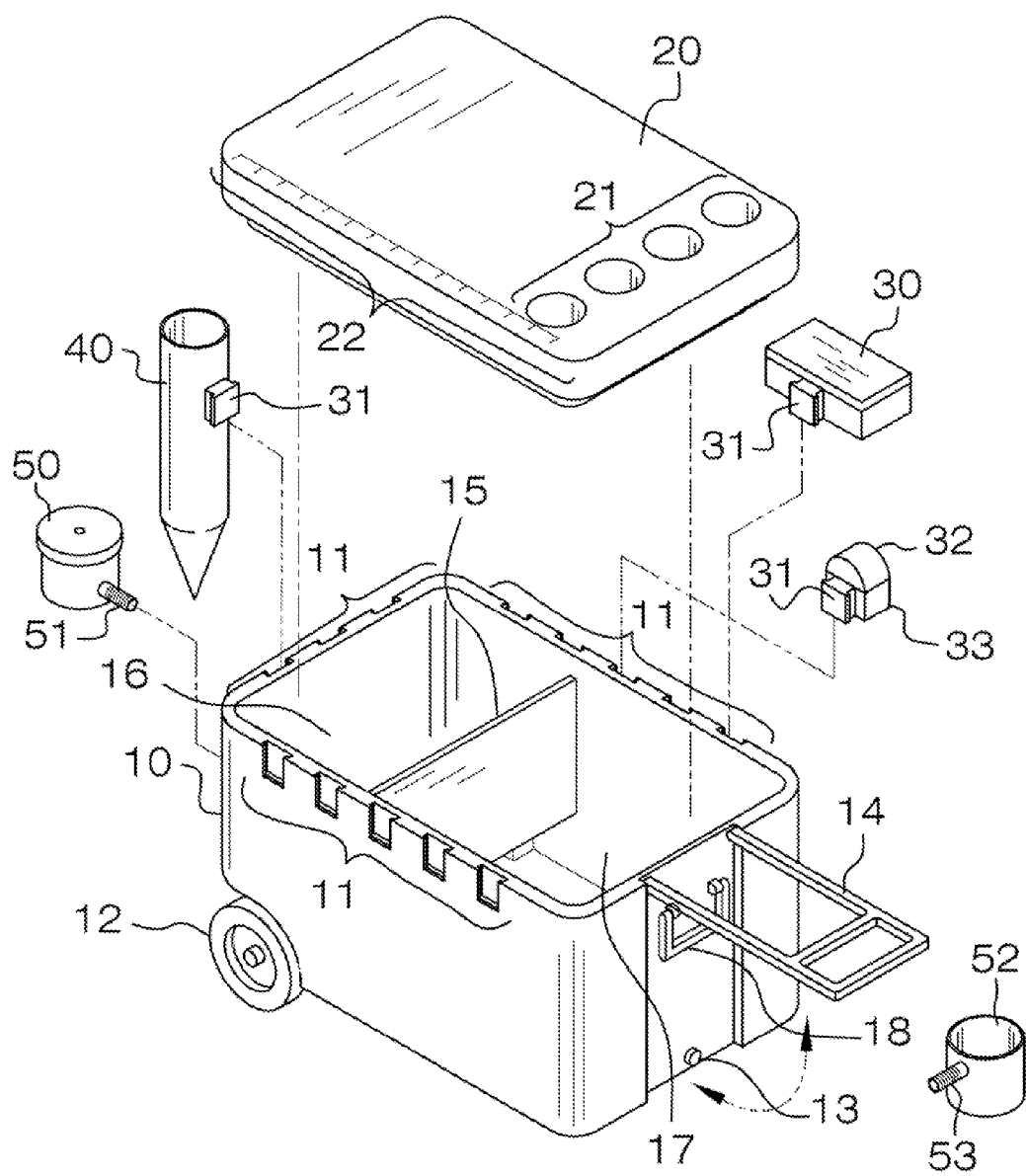
FIG. 2 illustrates an exploded view of the cooler, top, rod holder, tackle box, light, drain cup, and aerator.
Figure 3:
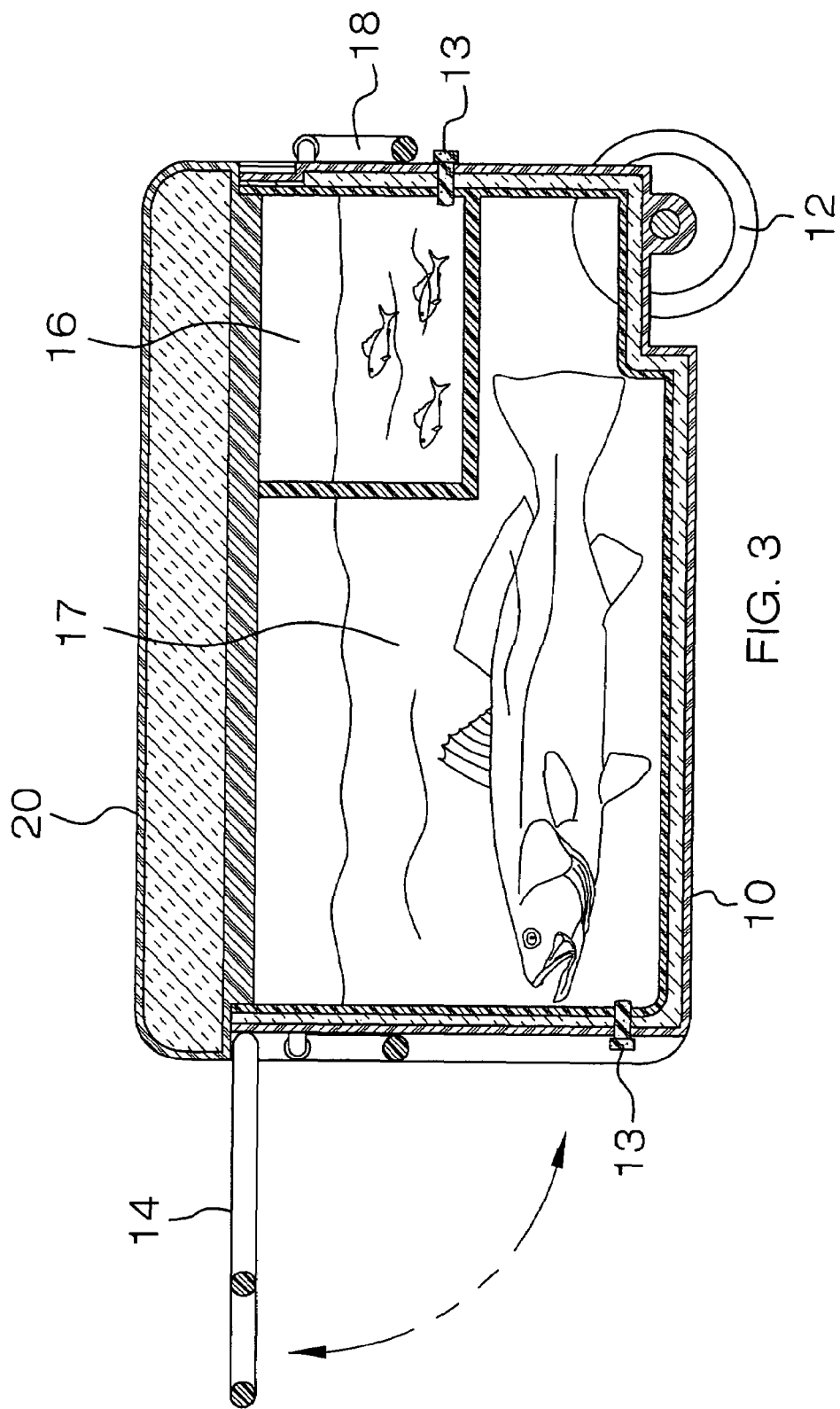
FIG. 3 illustrates a cross-sectional view along line 3-3.
Figure 4:
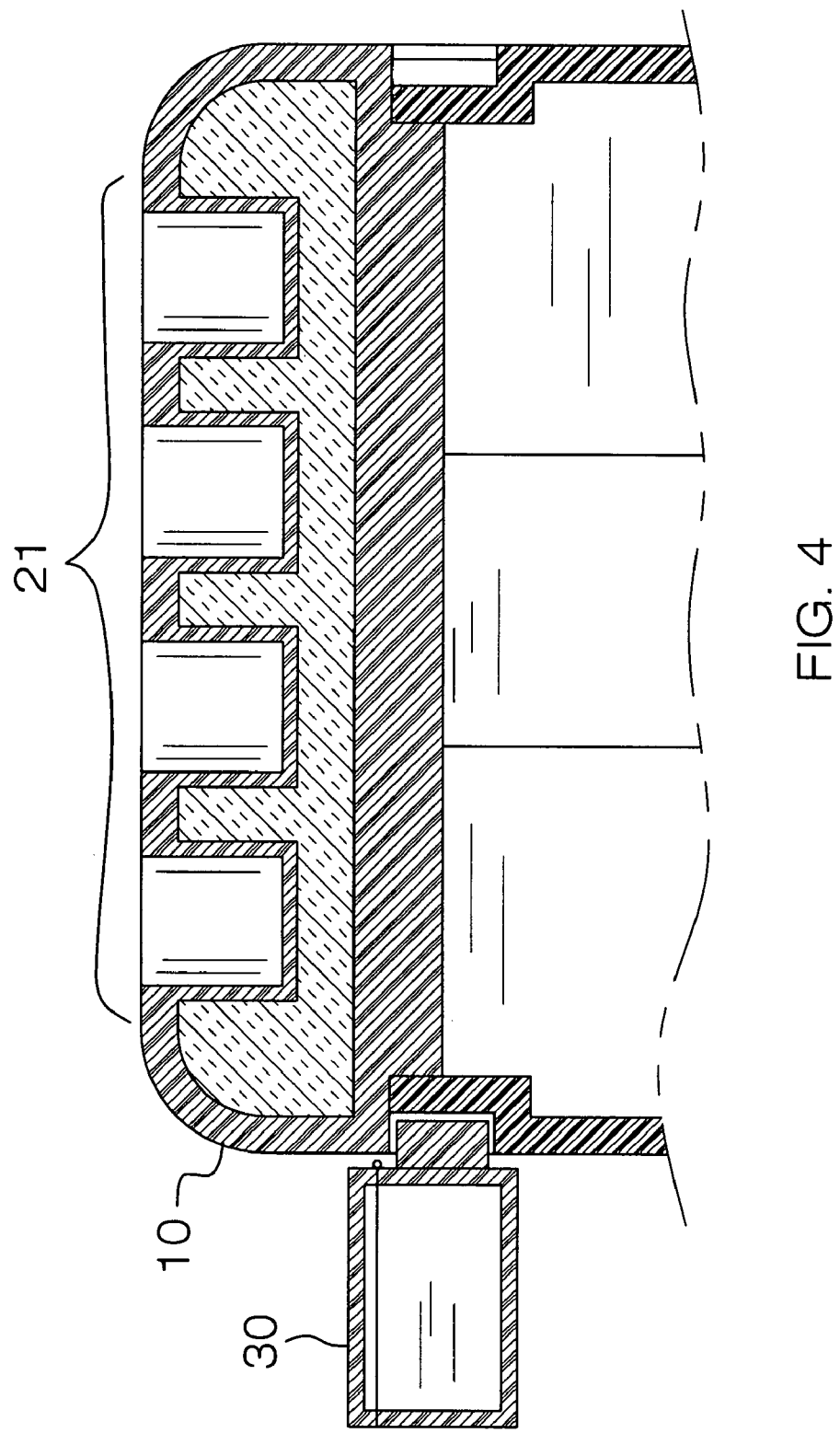
FIG. 4 illustrates a cross-sectional view along line 4-4.
Figure 5:
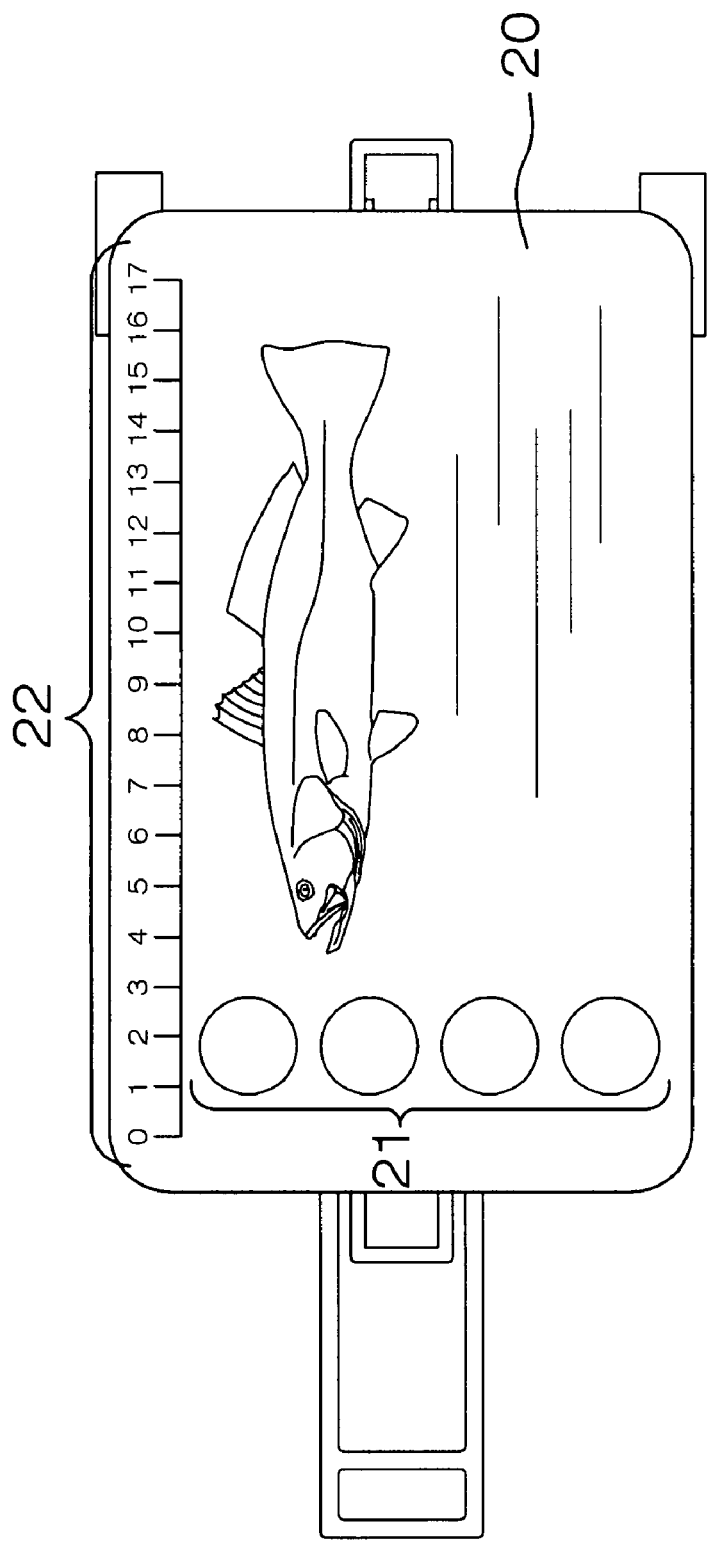
FIG. 5 illustrates a top view of the invention.

Detailed reference will now be made to the preferred embodiments of the present invention, examples of which are illustrated in the accompanying drawings. Referring to FIGS. 1-5, the invention comprises a cooler 10, a cooler top 20, a tackle box 30, a light 32, and a rod holder 40.

The cooler 10 has a plurality of grooves 11, which adorn the top exterior perimeter of the cooler 10. Attached at a bottom end is a pair of wheels 12 for mobilizing the cooler 10.

A pull handle 14 is hingedly attached to a side of the cooler 10. Inside of the cooler is a divider 15, which divides the interior compartment into two compartments. A fish bait compartment 16 is smaller in volume in relation to a caught fish compartment 17. Water cannot pass between either the fish bait compartment 16 and the caught fish compartment 17.

Figure 6:
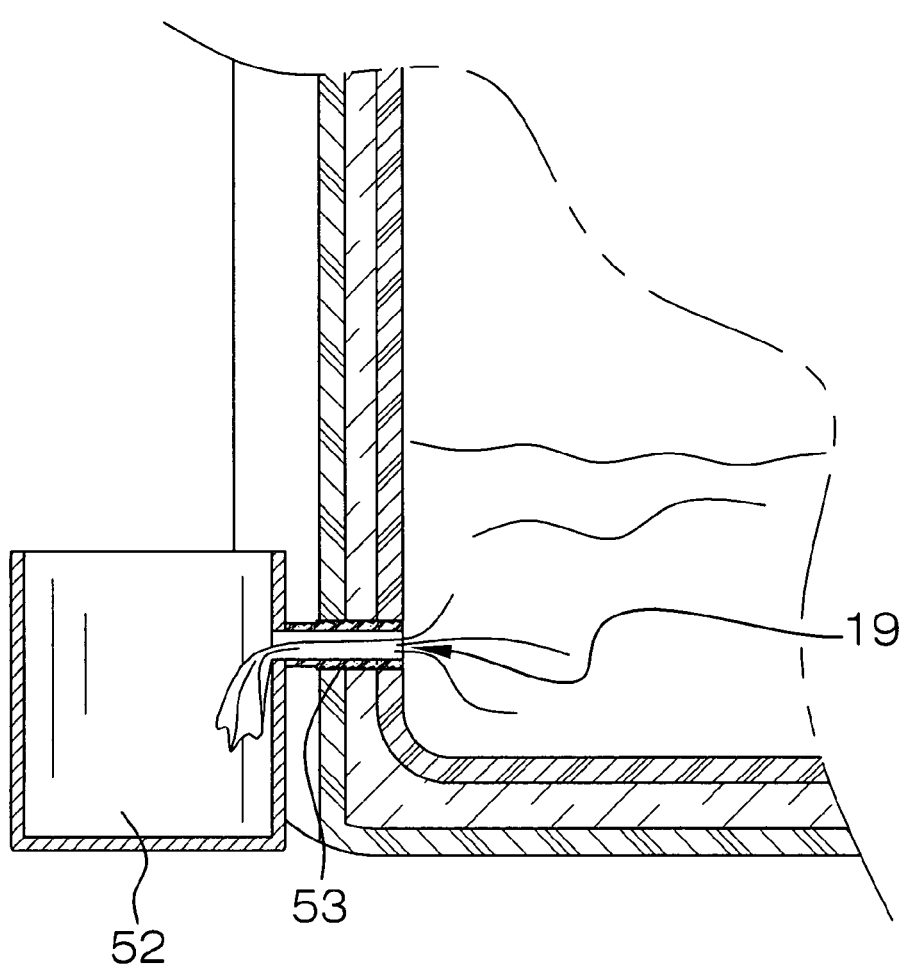
FIG. 6 illustrates a detailed view of the drain cup attached to the cooler.

Located along each of the ends of the cooler 10 are drain holes 19, which have an internal thread that is depicted in FIG. 6. A corresponding drain plug 13 fits inside of the drain hole 19, and seals off the interior of the cooler 10 such that no fluids can enter or escape the cooler through the drain hole 19. However, the drain plug 13 evacuates all liquids from the interior of the caught fish compartment 17 or the interior of the fish bait compartment 16, depending on which of the drain plugs 13 is removed.

An aerator 50 has protruding from it, an aerator threaded insert 51, which has external threads, shown in FIGS. 1 and 6, that correspond to the internal threads of the drain hole 19. The aerator 50 is an added feature of the invention 10 in that it aerates any water contained within either of the compartments located in the cooler 10 with oxygen that might otherwise be consumed by either the live bait or live caught fish, shown in FIG. 3.

An added feature of the aerator 50 is the ability to remove the aerator from the cooler 10 when there is no need for such application. The aerator is simply installed by aligning the aerator threaded insert 51 with the corresponding drain hole 19, and rotating the aerator 50 until it is snuggly fit onto the cooler 10.

A drain cup 52 has a drain cup threaded insert 53 that has external threading that corresponds to the internally threading of the drain hole 19. The drain cup 52 is an added feature of the invention 10 in that it enables a portion of the fluid contained inside of the cooler 10 to be removed. The drain cup 52 is installed and removed by winding or unwinding the drain cup so as to screw in or unscrew the drain cup 52 from the drain hole 19 of the cooler 10.

A plurality of carry handles 18, adorn the exterior of the cooler 10.

The cooler top 20 has a plurality of cup holders 21, and an integrated measuring line 22 for measuring caught fish. The cooler top 20 can be either completely removed from the cooler 10 or hingedly attached to the cooler 10.

The tackle box 30 has an external protrusion 31 that protrudes from the surface of the tackle box 30. The rod holder 40 has an external protrusion 31 that protrudes from the surface of the rod holder 40. The light 32 has an external protrusion 31 that protrudes from the surface of the light 32. The external protrusion 31 enable the tackle box 30, the light 32, or the rod holder 40 to be attached to any one of the grooves 11, which adorn the perimeter of the upper exterior of the cooler 10. The tackle box 30, the light 32, or the rod holder 40 can be removed from the exterior of the cooler 10, and placed inside of the cooler 10 for storage.

The light 32 has a battery compartment (not shown) contained within the housing, which can be accessed for the removal of or installation of batteries. The light 32 has a housing 33 which has an array of solar cells 34 located along a top surface of the housing 33 for powering the light 32.

The inventor claims:

1. A fishing cooler comprising:
    (a) a cooler having a bottom and walls extending upwardly from the bottom, the bottom and the walls defining an interior volume of the cooler, the walls defining opposing sides and opposing ends of the cooler, the sides and ends of the cooler defining an upper perimeter of the cooler at upper portions thereof, the bottom defining an underside of the cooler opposite the upper perimeter, wherein the cooler further comprises:
        (i) a plurality of grooves that adorn the upper perimeter of the cooler;
        (ii) a pair of wheels for mobility, which attach to the underside of the cooler;
        (iii) a hingedly attached pull handle which is connected to the cooler at the upper portion of one of the ends of the cooler, such that where necessary the end user may pull the cooler via the pair of wheels attached to the underside of the cooler;
        (iv) a divider, which divides the interior volume of the cooler into a fish bait compartment, and a caught fish compartment;
            wherein water can not pass between the fish bait compartment and the caught fish compartment;
        (v) a pair of drain holes which are located at predetermined points on the walls of the cooler so as to provide drainage means for both the fish bait compartment and the caught fish compartment;
            wherein the drain holes contain internal threads;
        (vi) a pair of carry handles which are attached to the exterior of the opposing sides of the cooler and provide means to carry the cooler as opposed to rolling the cooler;
    (b) a cooler top having a top side wherein the cooler top further comprises:
        (i) a plurality of cup holders which are integrated into the top side of the cooler top;
        (ii) a measuring line integrated into the top side of the cooler top, which provides a means to measure fish that are caught;
        (iii) the top side of the cooler top can also act as a cutting board;
        (iv) the cooler top can either be hingedly connected to one of the sides of the cooler or not hingedly connected at all, such that the top may be completely removed from the coolers
    (c) a tackle box comprising:
        an external protrusion which protrudes from a side of the tackle box and provides attaching means to the grooves located on the upper perimeter of the cooler;
    (d) a rod holder comprising:
        an external protrusion which protrudes from a side of the rod holder and provides attaching means to the grooves located on the upper perimeter of the cooler;
    (e) a pair of drain plugs comprising:
        the drain plugs containing external threading that correspond to the internal threads of the drain holes for the purpose of screwing and unscrewing the drain plugs to the drain holes for the purpose of sealing or unsealing the drain holes of the cooler;
    (f) an aerator comprising:
        the aerator having an aerator threaded insert that has external screw threads that correspond to the internal threads of the drain holes;
        wherein the aerator attaches to and can be removed from the drain hole by screwing or unscrewing the aerator to or from the drain hole;
        wherein the aerator can introduce oxygen to the water contained inside of the compartments of the cooler for the purpose of sustaining life to live bait or freshly caught fish that are contained in either of the fish bait compartment and caught fish compartment where the live bait and fish consume the oxygen from the water;

(g) a drain cup comprising:

the drain cup attaching to the cooler by a drain cup external threading that corresponds to the internal threading of the drain holes;

wherein the drain cup attaches to the cooler for the purpose of removing a predetermined portion of the liquid contained within the interior volume of the cooler;

and (h) a light comprising:

an external protrusion which protrudes from a side of the light and provides attaching means to the grooves located on the upper perimeter of the cooler; and wherein the light has a battery compartment contained within a housing of the light, which can be accessed for the removal of or installation of batteries.

2. The fishing cooler as described in claim 1 wherein the light is powered by an array of solar cells located along a top surface of the housing of the light.

\* \* \* \* \*